(12) United States Patent
Amariutei et al.

(10) Patent No.: US 10,013,083 B2
(45) Date of Patent: Jul. 3, 2018

(54) UTILIZING REAL WORLD OBJECTS FOR USER INPUT

(71) Applicant: QUALCOMM Incorporated, San Diego, CA (US)

(72) Inventors: Alexandru Amariutei, Toronto (CA); Evan Robbert Hildreth, Thornhill (CA)

(73) Assignee: QUALCOMM Incorporated, San Diego, CA (US)

(*) Notice: Subject to any disclaimer, the term of this patent is extended or adjusted under 35 U.S.C. 154(b) by 722 days.

(21) Appl. No.: 14/263,885

(22) Filed: Apr. 28, 2014

(65) Prior Publication Data
US 2015/0309629 A1    Oct. 29, 2015

(51) Int. Cl.
| G06F 3/048 | (2013.01) |
| G06F 3/041 | (2006.01) |
| G06F 3/01 | (2006.01) |
| G06F 1/16 | (2006.01) |
| G06F 3/03 | (2006.01) |

(52) U.S. Cl.
CPC ............ G06F 3/0412 (2013.01); G06F 1/163 (2013.01); G06F 3/017 (2013.01); G06F 3/0304 (2013.01); *G06F 2203/0381* (2013.01)

(58) Field of Classification Search
None
See application file for complete search history.

(56) References Cited

U.S. PATENT DOCUMENTS

| 6,771,294 B1* | 8/2004 | Pulli | G06F 3/011 |
| | | | 345/173 |
| 2006/0190836 A1* | 8/2006 | Ling Su | G06F 1/1616 |
| | | | 715/773 |
| 2006/0284853 A1* | 12/2006 | Shapiro | G06F 3/04883 |
| | | | 345/173 |
| 2008/0129694 A1* | 6/2008 | Haven | G06F 3/014 |
| | | | 345/158 |

(Continued)

FOREIGN PATENT DOCUMENTS

| EP | 2693319 A2 | 2/2014 |
| WO | 2014030902 A1 | 2/2014 |

OTHER PUBLICATIONS

Second Written Opinion for International Application No. PCT/US2015/027834, dated Apr. 8, 2016, 11 pgs.

(Continued)

*Primary Examiner* — William C Trapanese
(74) *Attorney, Agent, or Firm* — Hunter Clark/Qualcomm

(57) ABSTRACT

Methods, systems, apparatuses and computer-readable media for utilizing real world objects to interact with a user interface are presented. The method may comprise a device processing image data to identify an interactive surface area and an interacting object. Subsequently, the device may determine at least two regions of the interactive surface area. In addition, the device may map commands of a user interface to the at least two regions of the interactive surface area. Subsequently, the device may determine a selected region of the interactive surface area based on a proximity of the interacting object to the interactive surface area. In addition, the device may perform a mapped command of the user interface, wherein the mapped command is determined based on the selected region.

27 Claims, 10 Drawing Sheets

(56) References Cited

U.S. PATENT DOCUMENTS

| | | | |
|---|---|---|---|
| 2010/0199232 A1 | 8/2010 | Mistry et al. | |
| 2011/0133934 A1 | 6/2011 | Tan et al. | |
| 2012/0321150 A1* | 12/2012 | Ranganathan | G06F 3/0488 382/124 |
| 2013/0016070 A1* | 1/2013 | Starner | G02B 27/017 345/175 |
| 2013/0084980 A1 | 4/2013 | Hammontree et al. | |
| 2013/0265218 A1 | 10/2013 | Moscarillo | |
| 2013/0296057 A1 | 11/2013 | Gagner et al. | |
| 2014/0055343 A1* | 2/2014 | Kim | G06F 3/005 345/156 |
| 2014/0068476 A1 | 3/2014 | Kosaki | |

OTHER PUBLICATIONS

International Preliminary Report on Patentability—PCT/US2015/027834—EPO—Rijswijk, The Netherlands—dated Jul. 22, 2016—11 pgs.

International Search Report and Written Opinion—PCT/US2015/027834—ISA/EPO—dated Aug. 4, 2015, 14 pgs.

Turner A., "Hands on: Leap Motion gesture controller", The Sydney Morning Herald, Digital Life, http://www.smh.com.au/digital-life/computers/blogs/gadgets-on-the-go/hands-on-leap-motion-gesture-controller-20131014-2vhi2.html, Oct. 14, 2013, pp. 1-4.

* cited by examiner

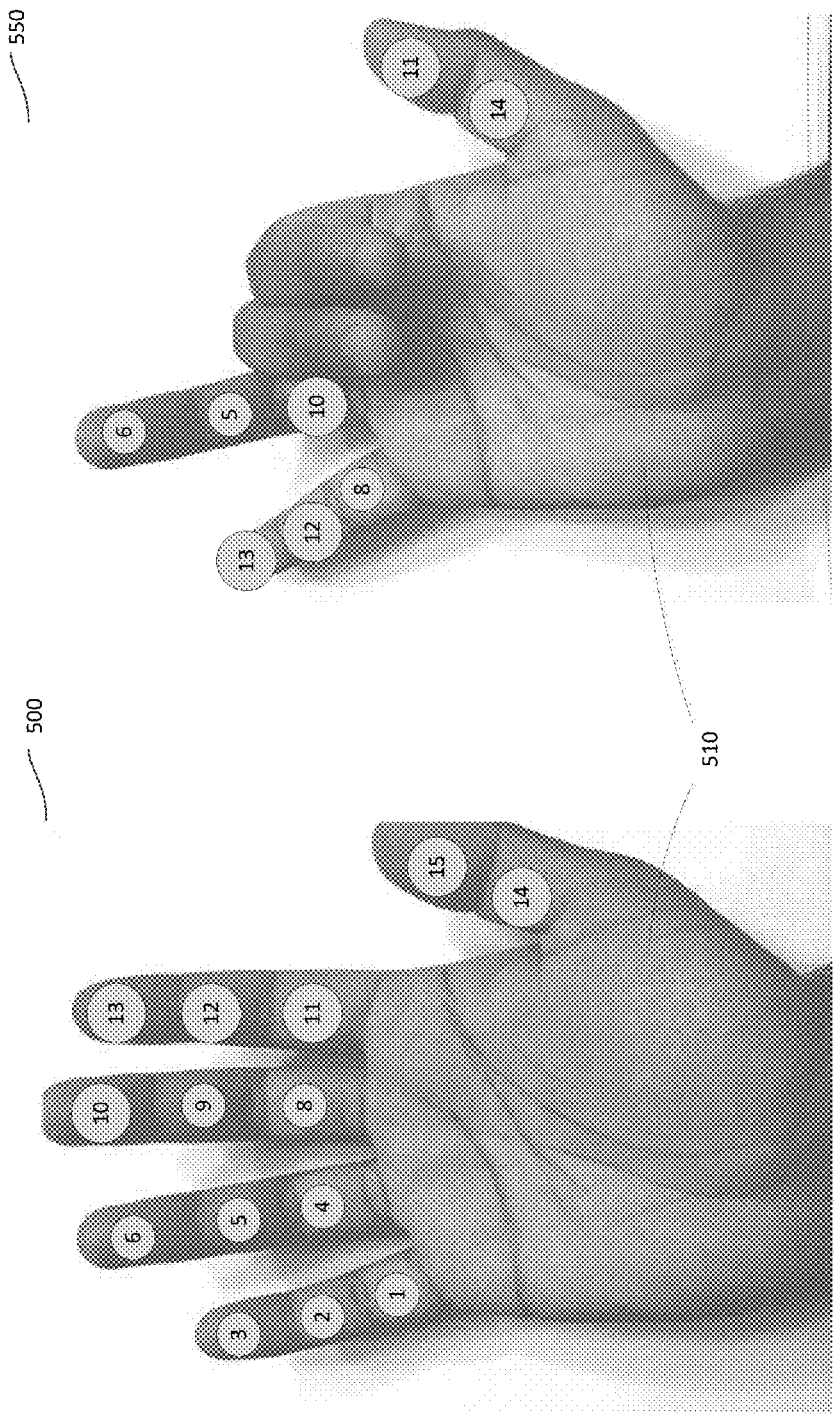

UTILIZING REAL WORLD OBJECTS FOR USER INPUT

BACKGROUND

Field

This disclosure generally relates to user interfaces for mobile devices.

Background

Mobile devices (e.g. phones, smartphones, personal digital assistants (PDAs), smart watches) provide various input methods for receiving data from users such as a keypads, touch interface, and/or gestures.

Traditionally, mobile devices featured QWERTY keypads. A QWERTY keypad has a fixed configuration of keys. The user interacts with the mobile device by pressing the physical keys, which produces an electrical signal that allows the mobile device to identify the pressed key.

Currently, many mobile devices feature a touchscreen interface. The touchscreen interface includes a virtual keypad that is displayed on the mobile device. In some mobile devices, the configuration of the keypad can be modified based on the application and/or use case. For example, on an iPhone®, the keypad configuration is slightly different when a user is using the email application versus using the web browser application. Additionally, also on an iPhone®, a button is provided to toggle between numbers and letters, but also holding certain buttons reveal additional "floating buttons". For example, holding the ampersand button, "&," reveals the section button, "§".

Some mobile devices feature a gesture interface. A gesture interface allows the user to interact with the mobile device without touching it. After the user performs a gesture that is preset in the mobile device, the mobile device performs a command associated with the performed gesture. For example, a user may wave at the mobile device, when the display is asleep, to wake up the device and turn on the display.

SUMMARY

Methods, systems, apparatuses and computer-readable media for using real world objects to interact with a user interface are presented.

In some embodiments, the method of a device may comprise processing image data to identify an interactive surface area and an interacting object. Subsequently, the device may determine at least two regions of the interactive surface area. In addition, the device may map commands of a user interface to the at least two regions of the interactive surface area. Subsequently, the device may determine a selected region of the interactive surface area based on a proximity of the interacting object to the interactive surface area. In addition, the device may perform a mapped command of the user interface, wherein the mapped command is determined based on the selected region.

According to some embodiments, a device may comprise at least one processor and memory. The at least one processor may be configured to process image data to identify an interactive surface area and an interacting object; determine at least two regions of the interactive surface area; map commands of a user interface to regions of the interactive surface area; determine a selected region of the interactive surface area based on a proximity of the interacting object to the interactive surface area; and perform a mapped command, on the device, wherein the mapped command is determined based on the selected region. The memory coupled to the least one processor.

According to some embodiments, an apparatus may comprise a means for processing image data to identify an interactive surface area and an interacting object; a means for determining at least two regions of the interactive surface area; a means for mapping commands of a user interface to regions of the interactive surface area; a means for determining a selected region of the interactive surface area based on a proximity of the interacting object to the interactive surface area; and a means for performing a mapped command, on the device, wherein the mapped command is determined based on the selected region.

According to some embodiments, one or more computer-readable media storing computer-executable instructions may comprise code for processing image data to identify an interactive surface area and an interacting object; code for determining at least two regions of the interactive surface area; code for mapping commands of a user interface to regions of the interactive surface area; code for determining a selected region of the interactive surface area based on a proximity of the interacting object to the interactive surface area; and code for performing a mapped command, on the device, wherein the mapped command is determined based on the selected region.

BRIEF DESCRIPTION OF THE DRAWINGS

Aspects of the disclosure are illustrated by way of example. In the accompanying figures, like reference numbers indicate similar elements, and:

FIGS. 5A and 5B illustrates examples of remapping commands of the user interface to visible regions of the interactive surface area.

DETAILED DESCRIPTION

The features and advantages of the disclosed method and apparatus will become more apparent to those skilled in the art after considering the following detailed description in connection with the accompanying drawing.

Systems and techniques herein provides for a more efficient and novel user interface (UI), which allows a user to utilize objects to interact with the UI.

Some devices, such as mobile devices, gaming systems, and smart televisions, have gesture interfaces that allow a user to interact with the device without physically touching it. One existing gesture system is the Leap Motion™ controller. The Leap Motion™ controller is a USB device, which attaches to another device such as a desktop computer, and allows the user to interact with the interface of the desktop computer by making hand gestures in midair. The Leap Motion™ controller contains a small infrared camera that detects a heat profile, which is then used to determine the position of the user's hand over time and convert the position of the user's hands into a position on the interface or recognize a gesture based on the position of the user's hand over time and notify the desktop computer to perform the command associated with the performed gesture.

Existing gesture recognition systems such as the Leap Motion™ controller may present a number of challenges. For example, since the gestures are predefined, a user must understand the execution and meaning of the gestures before use. Additionally, a user may be required to perform the gestures in midair, so the user does not receive any tactile feedback when performing the gestures. Lastly, a gesture system may require a large movement by the user for the gesture system to recognize the gesture, meaning a small task that might have been easily accomplished with fine motor controls, such as moving a mouse controller and clicking, is replaced by wide movements of the user's hands.

Some researchers have proposed using a projector to project a UI onto everyday objects or body parts. However, projecting a UI onto any surface presents various problems. For example, the projector is only moving the UI from the display screen to a different surface, such as a table. While this provides consistency to the user, it may not provide a better way for the user to interact with the device. Additionally, by displaying on a larger surface, it may prevent the user from using fine motor skills to interact with the device, and the fine motor movements may be replaced with wide ranging motions that are inefficient, cumbersome and tedious.

Figure 1:
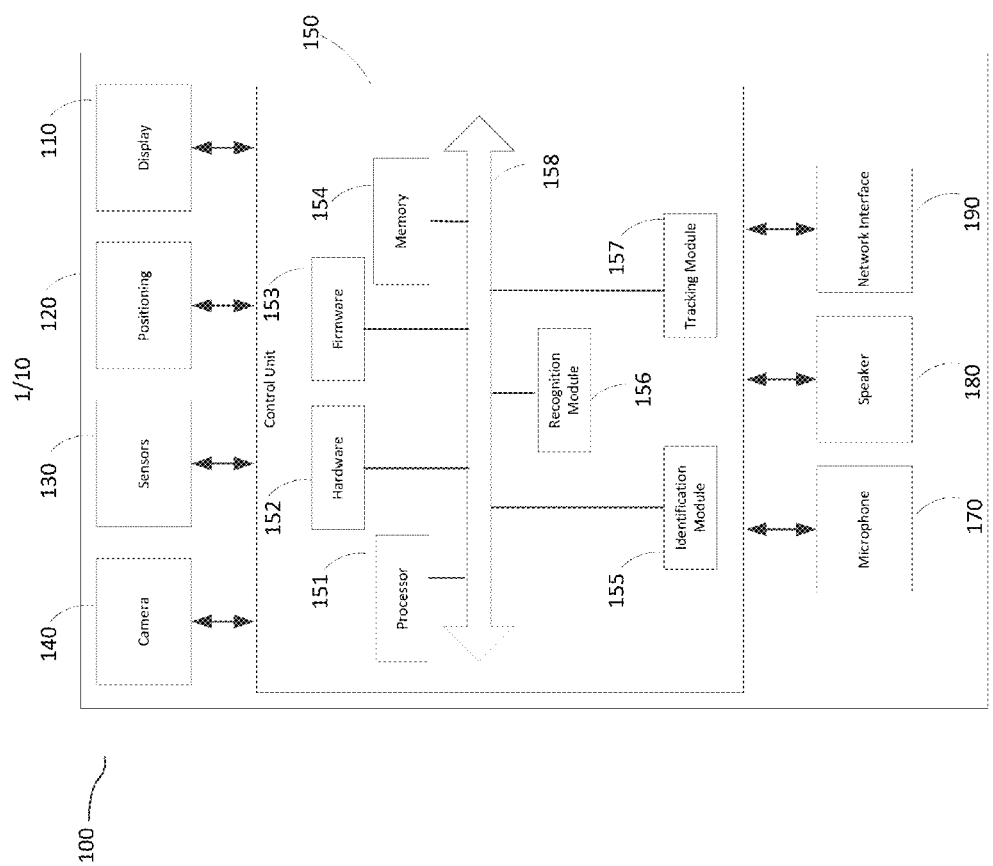
FIG. 1 is a block diagram illustrating an exemplary mobile device according to some embodiments.

FIG. 1 illustrates a user device 100 that may be consistent with some embodiments. The user device 100 may be a mobile device such as a smartphone, a tablet computer, a personal computer, a laptop or netbooks, a set-top box (STB) such as provided by cable or satellite content providers, or a video game system console. The user device 100 may also be a wearable device such as a smart watch, a head-mounted display (HMD) or other wearable computing device. The user device 100 may also be a device that is stationary or fixed such as a smart television, an entertainment center or console, an entertainment center in an automobile, a health care device or a smart home device. According to some embodiments, user device 100 may be implemented using any appropriate combination of hardware and/or software, wherein software refers to instructions stored in a computer readable medium and does not refer to software per se. A computer readable medium does not include a transitory propagating signal.

User device 100 may include a display 110 for displaying information to a user. The display 110 may be a liquid crystal display, organic light emitting diode display, a light emitting diode display, a plasma display, a cathode ray tube display, an interferometric modulator display, a field emission display, a projector, other display type, or a combination of the technologies above. The display 110 may be integrated with the user device 100 or may be separate from the user device 100. If the display 110 is separate from the user device, it may be coupled to the user device 100 via a wired or wireless connection.

The display 110 may be integrated into augmented reality (AR) glasses, such as Google Glass™. In one embodiment, the image data displayed on the AR glasses may be augmented to overlay each command on its associated region of the interactive surface area. For example, in a calculator application, each region of the interactive surface area may be associated with a particular number or calculator function, so a digit or a function may be displayed on top of its associated region.

User device 100 may also include a position location system 120. The position location system 120 may include a satellite positioning system, a terrestrial based positioning system or a combination thereof. The position location system 120 may include antenna(s), receiver(s), circuitry for processing signals/determining position, or any combination thereof. The position location system 120 may utilize communication signals, via the network interface 190, from various wireless technologies, such as Code Division Multiple Access (CDMA), Wideband Code Division Multiple Access (WCDMA), Long Term Evolution (LTE), Worldwide Interoperability for Microwave Access (WiMAX), WiFi, BlueTooth, etc. for determining the user device's position. The position location system 120 may utilize one or more sensors 130 to augment other positioning technologies and/or determine a position.

User device 100 may include one or more sensors 130. The sensors 130 may include accelerometers, magnetometers, gyroscopes, light sensors, proximity sensors, microphones, pressure sensors, microphones, cameras, etc. The sensors 130 may be used individually or in combination, and the sensors may be able to operate independent of one another or may be used interdependently.

User device 100 may include camera 140. A camera 140 may be a depth-sensing camera, Red-Green-Blue (RGB) camera, stereo camera, time-of-flight (ToF) camera, structured light camera, infrared camera, and/or ultraviolet camera. In some embodiments, the camera 140 may be configured to capture one or more images within the field of view of the camera 140. The camera 140 may be used for object recognition, tracking, gesture detection and other purposes. In some embodiments, object recognition, tracking, and/or gesture detection is performed at least partially using a control unit 150 that receives image data from the camera 140. In some embodiments, object recognition, tracking and/or gesture detection is performed at least partially using a control unit 150 external from the camera 140 and may be located elsewhere in the user device 100. In other embodiments, object recognition, tracking and/or gesture detection is performed at least partially in a control unit 150 external from the camera 140 and may be located outside of the user device 100. The camera 140 may be integrated into the user device 100 or it may be coupled to the user device 100 via a wired or wireless link, such as the network interface 190.

Additionally, in some embodiments the camera 140 may refer to multiple cameras that may be integrated into the user device 100, coupled externally to the user device 100 via wired or wireless links or a combination of both. Camera 140 may also refer to multiple cameras of different types, such as depth-sensing, infrared, ultraviolent, RGB, ToF, etc.

The control unit 150 may include at least one processor 151, hardware 152, firmware 153, and memory 154. Those components may communicate and interact thru a system bus 158.

The control unit 150 may include an identification module 155 for object and feature identification, which includes performing one or more object and feature identification algorithms on image data received from a camera 140. Object identification is different from object recognition because it does not involve recognizing what the object is but instead is able to differentiate objects from one another in the image data. Object identification can be performed in various manners such as pattern recognition, appearance-based detection, image matching, feature-based detection, etc.

The control unit 150 may include a recognition module 156 for object recognition, which includes performing one or more object recognition algorithms on image data received from a camera 140. Object recognition can be performed in various manners such as pattern recognition, appearance-based detection, image matching, feature-based detection, etc.

Additionally, the control unit 150 may include a tracking module 157 for tracking objects, features and/or regions of an object. Tracking may be performed prior to object recognition and object identification, in parallel with object recognition and object identification or after an object is recognized and/or identified. Tracking may include determining the location of an object over time. In addition, tracking may include estimating pose, orientation, depth information, movement of the object, speed of the object or any combination thereof about the tracked objects.

The control unit 150 may utilize both object identification and tracking for gesture detection. For example, the control unit 150 may detect a hand and track the movements of the hand to determine if a gesture is being performed. In some embodiments, gesture detection may include determining the movement of the tracked object, the speed of the movement, direction of the movement, or any combination thereof. In some embodiments, gesture detection may include building a model of the tracked object and determining the movement of the model.

In some embodiments, a gesture may only be detected if the gesture is performed in a designated area to avoid mistakenly performed gestures by the user. For example, a user may have their left hand flat and perform a gesture with their right hand, a user device 100 may require the user to perform the gesture with their the right hand on the palm of the left hand for the gesture to be identified by the user device 100. In some embodiments, the gesture may be performed entirely within the boundaries of the designated area. In another embodiment, the gesture may at least partially be performed within the boundaries of the designated area. For example, the gesture may start in the boundaries of the designated area but move beyond the boundaries. In another example, the gesture may start outside the boundaries of the designated area but move into the boundaries of the designated area.

In addition, the control unit 150 may use the sensor 130, speakers 180 and/or microphones 170 for gesture detection. For example, ultrasonic waves may be used to track an object and thereby aid in detecting gestures. Additionally, the microphone 170 may be used as an additional method of interaction by the user. In one example, a user may find it beneficial to use voice commands in addition to using objects when interacting with the UI.

The user device 100 may include a network interface 190 configured for communication with a network. Consistent with some embodiments, the network interface 190 may be configured to interface with a coaxial cable, a fiber optic cable, a digital subscriber line (DSL) modem, a public switched telephone network (PSTN) modem, other modem types, an Ethernet device, and/or various other types of wired network communication devices. The network interface 190 may also include one or more wireless transceivers, wherein each wireless transceiver may include an antenna that is separable or integral and is capable of transmitting and receiving information according to a different wireless networking protocol, such as Wi-Fi™, one or more 3G protocols, one or more 4G protocols, High-Speed Downlink Packet Access (HSDPA), LTE, Near Field Communications (NFC).

The terms "phalanges" and "phalanx" are used throughout to refer to regions of the finger associated with a particular phalanx.

Figure 2:
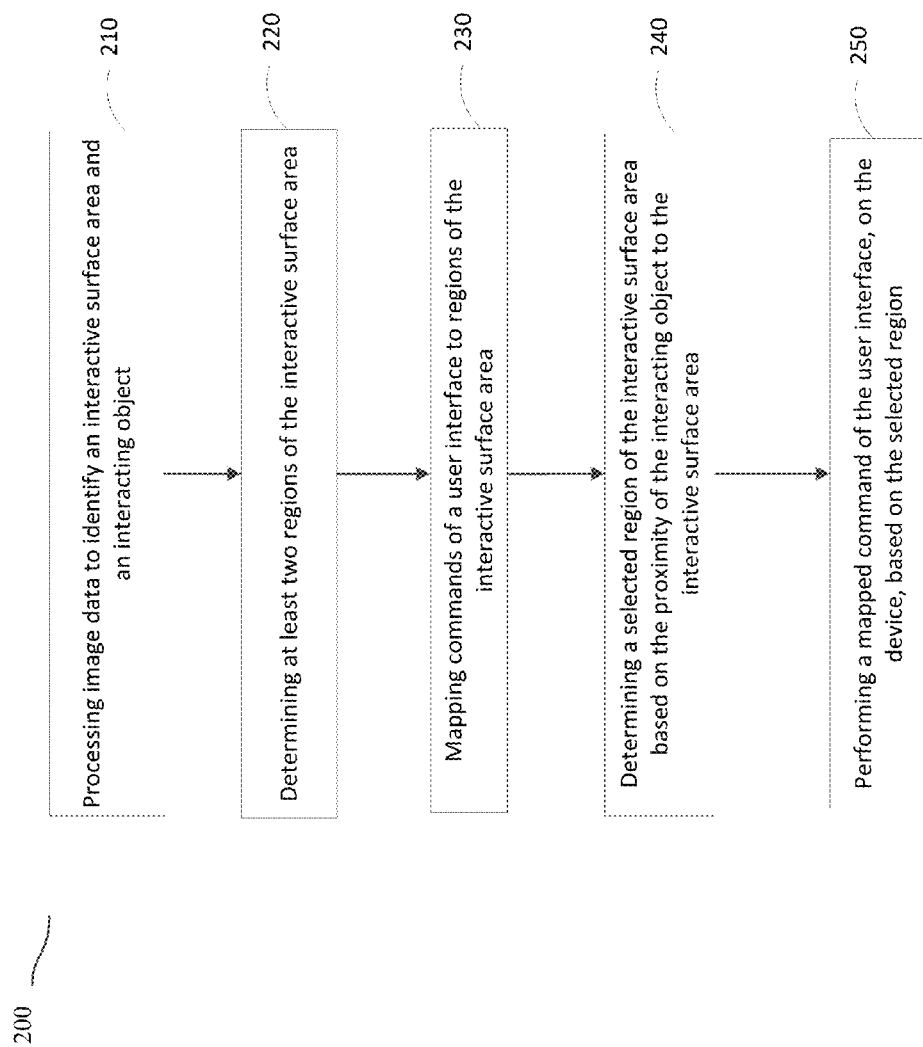
FIG. 2 is a flow diagram illustrating a method utilizing real world object interaction to interact with a user interface on a device, accordingly to one embodiment.

FIG. 2 is a flowchart illustrating a method 200 for utilizing real world objects to interact with a UI that may be consistent with some embodiments. The process begins by processing image data (stage 210) to identify an interactive surface area and an interacting object. In some embodiments, the image data is received from the camera 140. In some embodiments, the image data may consist of a single image, a series of images, and/or video. Additionally, the image data, in some embodiments, may consist of images, sets of images, video, and/or sets of videos. In some embodiments, the images and/or video may be from various points of view.

In some embodiments, the user device 100 uses various object identification techniques, such as pattern recognition, appearance-based matching, image matching, and/or feature-based detection, to identify the interactive surface area and the interacting object. In some embodiments, the user device 100 may also use various object recognition techniques to recognize the object or objects that are identified as the interactive surface area and interacting object.

In some embodiments, the interactive surface area may be determined based on the pose of an object. For example, a user device 100 may determine that a user intends to use their left hand as the interactive surface area, because the left hand is positioned flat and generally parallel with the camera 140. In another example, a user may hold their left hand upright and perpendicular to the camera 140, and the user device may determine that the user intends to use the upright left hand as the interactive surface area.

In some embodiments, the user device 100 may identify an interactive surface area based on the movement of objects in the image data. For example, there may be only a few objects that are moving in the image data, so the user device 100 may be able to quickly and easily distinguish the moving objects from other objects in the image data so the user device 100 may use this as a factor in identifying the interactive surface area. In some embodiments, user device 100 may obtain a user indication that a particular interactive surface area or interacting object is desired; e.g. movement of an object or other pre-defined indication can also be used by the user to indicate which object the user would like the use as the interactive surface area. For example, a user may want to use their hand as the interactive surface area, so the user may wiggle their fingers to prompt the user device 100 to select the user's hand as the interactive surface area. In some embodiments, movement of the object can be used to confirm the use of an object as the interactive surface area identified as a proposed interactive surface area or interacting object. For example, the user device 100 may identify the user's hand as a proposed interactive surface area, and the user device 100 may prompt the user to move the object within a certain amount of time to approve the object as the interactive surface area. In some embodiments, the user device 100 may identify an interactive surface area based on various factors such as: the number of objects in the image data, the size of the area, visibility of the area from the camera, the number of regions on the area, the mobility of the area compared to the interacting object, movement of objects in the image data, the interacting object or any combination thereof.

Additionally, the user device 100 may identify an interacting object. In some embodiments, the interacting object may be identified after the interactive surface area is identified. In some embodiments, the interacting object may be identified prior to or in parallel with detecting the interactive surface area. In some embodiments, the interacting object may be identified based on the pose of an object. For example, if a pre-defined selection pose to identify an interacting object is a vertical extension of a finger, a user device 100 may determine that a user intends to use the index finger of their right hand as the interacting object, because the index finger of their right hand is extended and perpendicular to the interactive surface area.

In some embodiments, movement of an object can also be used by the user to indicate that the user would like the use the object as the interacting object. In some embodiments, movement of the object can be used to confirm the use of an object as the interacting object. For example, the user device 100 may identify the user's hand as the interacting object, but the user device 100 may wait for the user to "approve" the use of object as the interactive surface area by making the object move. In some embodiments, the interacting object may be identified based on a variety of factors such as: the number of objects in the image data, the size of the interacting object, visibility of the interacting object from the camera, the mobility of the interacting object compared to the surface area, the interactive surface area, movement of objects in the image data, or any combination thereof.

In some embodiments, the user device 100 may identify the interactive surface area then the user can use the interactive surface area to select the interacting object based on one or more selection criteria; for example, by placing the interactive surface area on or in close proximity with the object that the user intends to use as the interacting object.

In some embodiments, the user device 100 may identify the interacting object then the user can use the interacting object to select the interactive surface area based on one or more selection criteria; for example, by placing the interacting object on or in close proximity with the object that the user intends to use as the interactive surface area.

Although the interacting surface and interacting object can be entirely separate (e.g., the interacting surface may be an area of a user's hand, while the interacting object may be a pen), in some embodiments, the interacting object may be part of/attached to the same object as the interactive surface area. For example, the user device 100 may identify the user's thumb as the interacting object and the phalanges of the user's other fingers on the same hand as the interactive surface area. This provides flexibility for the user so they can choose to use a single object, in this case a hand, rather being forced to always use two objects.

In some embodiments, the user may be identified as the interacting object and part or all of the surface area of an object around them may be the interactive surface area. For example, some or all of the surface area of a couch may be identified as the interactive surface area so when a user is watching a movie and gets off the couch, the movie is paused until the user returns and sits down on the couch.

In some embodiments, the interactive surface area may consist of at least one area associated with one or more objects.

In some embodiments, the user device 100 may identify a plurality of interactive surface areas. In some embodiments, the user device 100 may identify areas of several objects as a plurality of interactive surface areas. This may be beneficial for various reasons such as: very few regions on each object, the number of commands that need to be mapped, the lack of an ideal contiguous interactive surface area that has physical regions, etc.

In some embodiments, the user device 100 may identify a plurality of interacting objects, and the user device 100 may trigger an a particular command regardless of which interacting object selects or is in proximity with a particular region of the interactive surface area. For example, the user's left hand may be the interactive surface area, the user's pointer finger on the user's left hand may be a first region of the interactive surface area that is mapped to a particular command, and the user's right hand and a pencil may both be identified as an interacting object. If the user decides to initiate the particular command, the user may touch their right hand to the pointer finger of their left hand or may choose to touch the pencil to the pointer finger of their left hand.

In another embodiment, the user device 100 may identify a plurality of interacting objects, the user device 100 map a plurality of commands to a region of the interactive surface area, and the user device 100 may select a particular command from the plurality of commands based on which interacting object selects or is in proximity with the region of the interactive surface area. For example, a pencil and a user's pointer finger are identified as the interacting object, and a region of the interactive surface area may be mapped to the commands "play" and "pause." If the pencil touches or is in proximity of the region of the interactive surface area then the user device 100 triggers the command "play", but if the pointer finger touches or is in proximity of the same region of the interactive surface area then the user device 100 triggers the command "pause." As a result, this provides the user with extra flexibility for interactions and may potentially allow for a more natural and intuitive experience for the user.

In some embodiments, determining regions of the interactive surface area is performed using characteristics of the interactive surface area such as features of the surface area, the size of the surface area, or other features. For example, the size of the interacting object can be calculated to determine the bounds in which the interacting object and interactive surface area will interact. In some embodiments, the user device 100 may extrapolate a relative coordinate system of the interacting object and the interactive surface area. One advantage of this embodiment is it may allow for the reduction of the processing burden on user device 100.

One possible benefit for utilizing real world objects for user interaction with the UI may be the user may receive tactile feedback from the real world object. For example, when a user's thumb is the interacting object and their pointer finger is the interactive surface area, a user knows they have issued a command to the user device 100 when the user feels their thumb and pointer finger touch.

In some embodiments, the user device 100 may identify the interactive surface area and the interacting object, but may not have to recognize it. For example, the user device 100 may identify a hand as an interactive surface area and another hand as the interacting object; however, the user device 100 does not need to know that the interactive surface area and the interacting object are both hands.

After the interactive surface area and interacting object have been identified, the user device 100 determines at least two regions of the interactive surface area (stage 220). For example, if the user device 100 identifies a user's hand as the interactive surface area, it may determine that each finger on the user's hand is a different region.

In some embodiments, the regions of the interactive surface area may be determined based on the pose of the interactive surface area (or the object having the interactive surface area). For example, a user device 100 may determine that each finger is a separate region if the user spreads their fingers apart, but if a user were to perform a Vulcan salute with their hand—the pointer finger and middle finger are touching but separated from the ringer finger and pointer finger, which are also touching—then the user device 100 may determine the thumb is one region, the pointer finger/middle finger is a second region and the ring finger/pinky is a third region of the interactive surface area.

In some embodiments, the user device 100 may determine regions of an interactive surface area based on various physical features of the interactive surface area. For example, the natural physical crevices that separate phalanges in each finger or creases in the skin of the palm may be one factor used in determining regions of an interactive surface area. In some embodiments, the user device 100 may determine regions of an interactive surface area based on various factors such as: the number of detected objects in the image data, the size of the area, visibility of the area from the camera, the number of regions on the area, the mobility of the area compared to the interacting object, the interacting object, physical features of the interactive surface area, the likelihood of being able to distinguish between regions, the color of the regions on the area or any combination thereof.

One possible benefit for utilizing real world objects for user interaction with the UI may be the user may receive visual information from the real world object. For example, the creases of skin in a user's hand create visually delineated regions without the need to project an image onto the user's hand.

In some embodiments, after the regions of the interactive surface area are determined, the user device 100 may track each region. For example, if a user's hand is the interactive surface area and each phalanx on the user's hand is a region of the interactive surface area then a user may contort their fingers so some regions are visible and others are not. Identifying a region may be a time consuming process, so by tracking each region the user device 100 may quickly and accurately determine whether an interaction occurred rather than periodically identifying each region and attempting to determine if an interaction occurred. Additionally, tracking each region allows the user device 100 to quickly remap commands, if needed, when a region or region(s) are no longer visible from the camera's frame of reference.

In some embodiments, the user device 100 may track a subset of randomly selected regions, wherein the subset is less than the total number of regions. For example, each phalanx of the user's hand may be identified as a region, but the user device 100 may track one phalanx from each finger.

In some embodiments, the user device 100 may select a subset of regions to track based on the recognized interactive surface area. For example, the user device 100 may recognize the interactive surface area is a hand, so the user device 100 may track the distal phalanx region of each finger on the user's hand, because it is more likely these phalanges may "disappear" from the view of the image data when the user contorts their hand.

In some embodiments, the user device 100 may group regions of the interactive surface area and track the group. For example, if each phalanx of the user's hand is a region of the interactive surface area then the user device 100 may group the phalanges that make up a user's finger and track the finger instead of tracking each phalanx.

In some embodiments, the interacting object may be tracked. By tracking the interacting object, the user device 100 may determine the likelihood of interaction and which region may be selected by the interacting object. The user device 100 may utilize this as a way to reduce the computational complexity of tracking each region of the interactive surface area.

A UI is an interface that is understandable to a user and allows the user to perform one or more commands that are then used as inputs. For example, the UI may be an application that is running on the user device 100. In another example, the UI may be an application that is running on a device that is attached to the user device 100. In another example, the UI may be an operating system of the user device 100 or the operating system of a device attached to the user device 100.

In some embodiments, commands of the UI are mapped to regions of the interactive surface area (stage 230). For example, if the UI is for a video application and a user's hand is identified as the interactive surface area, the user's index finger may be mapped to the command "play", the user's middle finger may be mapped to the command "stop", the user's ring finger may be mapped to the command "rewind" and the user's pinky finger may be mapped to the command "fast forward." In some embodiments, the mapping 230 may be done in parallel with identifying the interactive surface area and/or the interacting object. In other embodiments, the mapping 230 may be done after an interactive surface area and/or an interacting object are identified. The mapping is dynamic and does not use a predetermined template or predefined key map.

In some embodiments, a command may be mapped to a plurality of regions across a plurality of interactive surface areas. In one example, the interactive surface areas may be all or part of the surface of the user's cellphone and one or more areas of the pointer finger on the user's left hand, and the interacting object may be the user's right hand, and both of the user's ears. The user device 100 may be attached, wired or wirelessly, or integrated into a television and the user may be watching a video. The user's cellphone and the pointer finger on the user's left hand may be mapped to the command "pause", so when a video is playing on the television and a user receives a call and places the cellphone next to the user's ear, the user device 100 detects the interaction and pauses the video. Additionally, if the user wants to pause the video, the user can use their right hand to touch the pointer finger on their left hand. As a result, mapping the same command to a plurality of regions can improve the user's experience by interacting with the UI based on the user's real world interactions with objects.

In some embodiments, the user device 100 may utilize sensors 130 to determine the interaction between the interactive surface area and the interacting object. For example, a user's interaction with their cellphone while watching television may produce a false positive result because users may multitask while watching television, so instead the user device 100 may utilize a microphone 170 to listen for the user voice while the cellphone is within a particular proximity of the user's ear before the associated command is triggered.

In some embodiments, the user device 100 may map a command to be triggered when the interacting object and a region of the interactive surface area are no longer in proximity of one another or no longer touching. For example, the user device 100 may be attached to a television and the user is watching a video on the television. The user device 100 may identify the user as the interacting object and the couch cushions as the interactive surface area. If the user gets up and moves away from the couch cushions then the command "pause" may be triggered, but if the user repositions themselves to lay down on the couch while still touching or in proximity of at least one cushion then the command is not triggered.

In some embodiments, the user device 100 may map a command to two or more regions, wherein the user device 100 triggers the command after the interacting object interacts with the two or more regions. For example, the user device 100 may be attached, thru a wired or wireless interface, or integrated into a television and the user may be watching a video on the television. The user device 100 identifies the user as the interacting object, the user's phone as one region of the interactive surface area, and a couch as another region of the interactive surface area. The command "pause" may be mapped so that the command will only be triggered if the user gets off the couch and the user is interacting with their phone. This may be beneficial for cases where one interaction may result in a false positive result, but having two or more interactions greatly reduces the risk of a false positive.

In some embodiments, the user device 100 may map a command to two or more regions, wherein the user device 100 triggers the command after the interacting object interacts with the two or more regions in a particular sequence.

In another embodiment, the user device 100 may map a command to a region but the use device 100 may be trigger the command after two or more interacting objects interact with the region.

In some embodiments, a command may be mapped to a region but the command may be triggered only after the two or more interacting objects interact with the region in a particular sequence.

In some embodiments, a maximum threshold for the number of regions of the interactive surface area that the interacting object can interact with at once is determined. This to prevent a false positive from occurring in natural situations when the user did not intend a command. For example, one of the user's hands may be identified as the interactive surface area and the other hand may be identified as the interacting object, but if the user were to clap their hands then it may unintentionally trigger the commands mapped to each region of the interactive surface area. Instead, if the user clapped, the user device 100 would determine the number of selected regions of the interactive surface area and if that number exceeded the threshold, the user device 100 would not perform any of the commands.

In some embodiments, a region or regions of the interactive surface area may be determined as a gesture area. The gesture area is an area on the interactive surface area where multiple gestures may be performed by the interacting object. For example, a user's hands may be the interactive surface area and the interacting object and the palm on the interactive surface area may be the gesture area, so a user can perform various gestures, such as pinch, swipe, flick, rotate, etc., with their interacting object hand on the gesture area of the interactive surface area.

In some embodiments, the regions of the interactive surface area may be mapped with a command as well as be an area determined to be a gesture area.

In some embodiments, a region or regions of the interactive surface area may be determined as a trackpad area. In some embodiments, the trackpad area may be the same area as the gesture area. The purpose of the trackpad area is to imitate the use of a trackpad, and in some circumstances improve upon it. For example, one of the user's hands may be the interactive surface area and the palm may be the trackpad area, the user's interacting object hand can interact with the trackpad area to mimic interactions with current trackpads. In some embodiments, a 3D component may be incorporated to improve upon current trackpads and provide additional ways for the user to interact with the UI. For example, the interacting object can move on the z axis to navigate a 3D UI.

In some embodiments, the regions of the interactive surface area may be mapped with a command as well as be an area determined to be a trackpad area.

In some embodiments, a region or regions of the interactive surface area may be determined as a slider control. In some embodiments, the slider area may be the same area as the gesture area. The purpose of a slider area is to imitate the use of a slider control, and in some circumstances improve upon it. For example, one of the user's hands may be the interactive surface and an extended finger may be the slider area, the user's interacting object hand can interact with the slider area to mimic interactions with current slider controls. For example, a user may adjust the audio volume level by sliding an interacting object along a finger of the interactive surface area, whereby sliding the interacting object towards the tip of the interactive surface area finger increases the volume level, and sliding the interacting object towards the base of the interactive surface area finger decreases the volume level. A user may adjust the audio volume level by tapping an interacting object to a finger of the interactive surface area, whereby touching the interacting object to the tip of the interactive surface area finger selects maximum volume, tapping the interacting object to the base of the interactive surface area finger selects minimum volume, and tapping the interacting object to a point along the interacting object finger selects a volume level proportional to the position touched within the length of the interacting object finger. In some embodiments, a 3D component may be incorporated to improve upon current slider controls and provide additional ways for the user to interact with the UI. For example, the interacting object can move on the z axis to change the range between the minimum and maximum, or the scale of the increase or decrease caused by sliding along a length of the interactive surface area finger.

In some embodiments, a region or regions of the interactive surface area may be determined as a scroll bar. In some embodiments, the scroll area may be the same area as the gesture area. The purpose of a scroll area is to imitate the use of a scroll bar control, and in some circumstances improve upon it. For example, one of the user's hands may be the interactive surface area and an extended finger may be the scroll area, the user's interacting object hand can interact with the slider area to mimic interactions with current slider controls. For example, a user may scroll within a page of text by sliding an interacting object along a finger of the interactive surface area, whereby sliding the interacting object towards the tip of the interactive surface area finger scrolls upwards in the page, and sliding the interacting object towards the base of the interactive surface area finger scrolls downwards in the page. A user may scroll by touching an interacting object to a finger of the interactive surface area, whereby tapping the interacting object to the tip of the interactive surface area finger scrolls one page up per tap, and touching the interacting object to the base of the interactive surface area finger scrolls one page down per tap. In some embodiments, a 3D component may be incorporated to improve upon current slider controls and provide additional ways for the user to interact with the UI. For example, the interacting object can move on the z axis to change the number of pages scrolled per, or the scale of the increase or decrease caused by sliding along a length of the interactive surface area finger.

In some embodiments, a region or regions of the interactive surface area may be determined as a zoom control. In some embodiments, the zoom area may be the same area as the gesture area. The purpose of a zoom area is to imitate the use of a zoom control, and in some circumstances improve upon it. For example, one of the user's hands may be the interactive surface area and an extended finger may be the slider area, the user's interacting object hand can interact with the zoom area to mimic interactions with current zoom controls. For example, a user may zoom into or out of a photo or map by sliding an interacting object along a finger of the interactive surface area, whereby sliding the interacting object towards the tip of the interactive surface area finger increases a magnification level, and sliding the interacting object towards the base of the interactive surface area finger decreases a magnification level. A user may adjust the magnification level by tapping an interacting object to a finger of the interactive surface area, whereby touching the interacting object to the tip of the interactive surface area finger selects maximum magnification, tapping the interacting object to the base of the interactive surface area finger selects a minimum magnification, and tapping the interacting object to a point along the interacting object finger selects a magnification level proportional to the position touched within the length of the interacting object finger. A maximum magnification, minimum magnification, or magnification level may cause an image or map to be displayed in its entirety, at maximum resolution, at a resolution 1:1, etc. In some embodiments, a 3D component may be incorporated to improve upon zoom controls and provide additional ways for the user to interact with the UI. For example, the interacting object can move on the z axis to change the range between the minimum and maximum magnification levels, or the scale of the increase or decrease caused by sliding along a length of the interactive surface area finger.

One possible benefit for limiting commands to a gesture area or similar area is it limits processing requirements. For example, rather than processing all parts of the image, the image processing can be limited to areas in proximity to the gesture area or similar areas.

In some embodiments, a projector is not attached to or connected to the user device 100, so the user device 100 may notify a user of the mapping of commands to the interactive surface area by displaying a visual depiction of the interactive surface area with the commands. For example, a user hand 700, the interactive surface area, may be displayed with commands. In some embodiments, a visual depiction of the interactive surface area may have a stylized visual appearance. For example, a visual depiction of the interactive surface area may appear as a small icon in the corner of the display 110. In some embodiments the display 110 may be attached or connected to the user device 100. In some embodiments, a user device 100, such as a HMD, may overlay a visual depiction of the interactive surface area onto the image data to be displayed by the display 110.

In some embodiments, mapping commands of a UI to regions of the interactive surface area comprises selecting the number of commands based on the number of regions of the interactive surface area and correlating commands to regions, wherein each region corresponds to a particular command or particular set of commands. For example, a video application may require the following commands: "Play/Pause", "Rewind" and "Fast Forward", and there may be three regions available on the interactive surface area, so the first region may be correlated with "Play/Pause", the second may be correlated with "Rewind" and the third region may be correlated with "Fast Forward."

In some embodiments, the commands of the UI may be remapped to regions of the interactive surface area based on the visibility of the tracked regions of the interactive surface area. For example, the phalanges of a user's left hand may be mapped with commands, but the user may move their fingers so that the ring and pinky finger are no longer visible from the camera. As a result, the user device 100 remaps the commands to make better use of the remaining visible fingers.

In some embodiments, remapping of commands may comprise determining the visibility of each region. If a region is determined to be hidden, the user device 100 may determine the priority of commands and if the priority for a command mapped to a hidden region exceeds the priority for a command mapped to a visible region then the user device may remap the commands to the regions of the interactive surface area based on the priority of commands.

In some embodiments, the user device 100 maps the commands to regions of the interactive surface area based on various factors such as: the likelihood of use, the number of commands required by an application and/or operating system, the ability to organize the commands, and/or regions previously associated with that particular command.

In some embodiments, the user device 100 may mapping commands to regions of the interactive surface area based on a user's preference. For example, a user may input a preference for having the more frequently used commands mapped to the top phalanx of each finger if their hand is the interactive surface area. In some embodiments, the user device 100 may display a command to be mapped, detect a selected region of the interactive surface area, based on the proximity of the interacting object to the interactive surface area, and mapping the command to the selected region of the interactive surface area.

A user device 100 may map sets of commands to regions based upon a pose, orientation, or position of the interactive surface area, or a pose, orientation, or position of the interacting object. For example, a user may orient the interactive surface area horizontally, causing a set of commands representing the numeric buttons of a keypad to be mapped to regions corresponding to each phalanx in each finger. For example, if the user rotates the interactive surface area to a vertical orientation the set of commands changes to represent volume sliders or zoom controls to be mapped to regions representing the lengths of the fingers. In another example, a user may use the tip of their finger as the interacting object to access a first command, and use a knuckle of their finger as the interacting object to access a second command, on the same region of the interactive surface area. If the numeric buttons of a keypad are mapped to regions corresponding to each phalanx in each finger, the user may touch the tip of their finger to a phalanx to activate the number, or touch the knuckle of their finger to a phalanx to active a symbol corresponding to that number. In some embodiments, the overall number of commands that may invoked may be much larger than the number of regions of their hand.

A user device 100 may map sets of commands to regions based upon a gesture performed by the interacting object. For example, a user may perform a "page turn" gesture with the interacting object, whereby a new set or "page" of commands are mapped to regions of the interactive surface area.

In some embodiments, a user device 100 may map sets of commands sets of commands to regions based on a relative position of the interactive surface area relative to the user or the interacting object. For example, a first set of commands are mapped to regions of the interactive surface area if the interacting surface area is far from the user's face, and a second set of commands are mapped to regions of the interactive surface area if the interacting object is close to the user's face.

In some embodiments, a user device 100 may map commands or sets of commands to regions based on the application state or device state. For example, if a device powered off, one set of commands may be mapped to the regions of the interactive surface area; however, if the device powered on, a second set of commands may be mapped to the regions of the interactive surface area, wherein the second set of commands includes at least one command that was not included in the first set of commands. In another example, if a video application is currently playing a video, the commands "Pause", "Rewind", and "Fast Forward" may be mapped to regions of the interactive surface area, but if the video on the video application is currently paused then the commands "Play", "Rewind" and "Fast Forward" may be mapped to regions of the interactive surface area.

In some embodiments, a user device 100 may map commands or sets of commands to regions based on an application's priority. For example, if a device has "Play/Pause", "Rewind" and "Fast Forward" commands mapped to the interactive surface area while a video application is running, but the device receives an incoming phone call while playing video, the user device 100 may identify that the incoming call has increased the phone application priority to exceed the video application's priority and as a result the user device 100 may remove the video application's commands and map the phone application's commands, such as "Answer" and "Reject", to regions of the interactive surface area. If a user selects the "Reject" command, the phone application After commands are mapped to regions of the interactive surface area, a user device 100 may determine if a region of the interactive surface area is selected based on the proximity of the interacting object to the interactive surface area (stage 240). In some embodiments, the user device 100 may have a proximity threshold that must be met or exceeded between the interacting object and the region of the interactive surface area for the region to be selected. In other embodiments, the user device 100 may have a proximity threshold that must be below or up to the threshold between the interacting object and the region of the interactive surface area for the region to be selected.

After a region is determined to be selected, a mapped command associated with the selected region is performed (stage 250). In some embodiments, the mapped command is performed on the user device 100. In some embodiments, the user device 100 determines the corresponding mapped command and send the mapped command to a second device that the user device 100 is attached to thru a wired interface and/or wireless interface. For example, the user device 100 may be an integrated camera that is attached to the television; as a result, the user device 100 may determine the region associated with the command "pause" has been selected and the pause command is sent from the user device 100 to the television.

The method 200 provides various benefits. In general, people use a lot of communicative gestures that involve both hands when expressing themselves. These gestures are fairly straight forward and easily understood by others. These gestures, depending on its complexity and the orientation of the hands, can be used to model more intuitive UI rather than redesigning human interaction to fit in the context of the UIs. As a result, one benefit of method 200 may be to enable a more natural interaction for the user that is more intuitive compared to current UIs.

Another benefit of method 200 is a more dynamic UI that adapts to the user rather than the user adapting to the UI. For example, a hand can take many forms and can be found anywhere in space—within the bounds of camera frame capture—and as consequence, can generate a language much more inclusive than current UIs can simulate. By adopting this mechanism, the UIs adjust to the orientation and changes of the interactive surface area and the interacting object.

An additional benefit of method 200 includes enabling fine motor control without having to be near the user device 100. For example, a user may be watching a video on a smart television and rather than having a remote control with defined functions, the smart television could identify the user's hands as the interactive surface area and the interacting object. The interactive surface area may allow the user to switch channels, control the volume, control playback/recording functionality, etc. while only making small movements with their hands.

One possible benefit for enabling a user to utilize real world objects for user input is it may allow for the miniaturization of devices. In some cases, user input technology may prevent the user device 100 from being smaller. For example, the user device 100 may have a touch interface but a touch interface requires a screen be large enough for the user to be able to interact it. As the screen size gets smaller, a touch input interface may become more infeasible because a user's input speed may decrease from either false positives or the limited number of commands that can be displayed at once. However, by utilizing real world objects this may allow a user device 100 to decrease the size of the screen and may further allow the user device 100 to shrink in size.

For example, the user device 100 may be a head mounted display (HMD), which may have a small display 110 positioned in front of a user's eyes. In an embodiment of an HMD, a camera 140 may be incorporated into the frame of the HMD, such that when worn like a pair of eye glasses, the field of view of the camera 140 includes an outward and downward view capturing the user's hands when the user holds their hands at chest level in front of their torso.

In another example, the user device 100 may be a smart watch, which may have a small display 110. In one embodiment of a smart watch, a camera 140 may be incorporated into the clasp of the band, such that when worn normally on a wrist, the field of view of the camera 140 includes a view of the palm of the hand. In another embodiment of a smart watch, a camera 140 may be incorporated into the crown of a watch (or area where a crown is positioned in a conventional watch), such that when worn normally on a wrist, the field of view of the camera 140 includes a view along a finger in a pointing pose.

Another possible benefit for allowing a user to utilize real world objects to interact with the UI is it may allow for power savings or allow for smaller batteries in a user device 100. For example, in mobile devices, one type of user device 100, a mobile device's display is one of the largest power consuming components in the mobile device, and while decreasing the display size may decrease power consumption this may not be allowed because the display may be the only user input method available for the user to interact with the UI. By contrast, allowing the user to interact with real world objects may allow the user device 100 to decrease the display size and may thereby decrease power consumption while still maintaining a method of user input.

Another possible benefit for allowing a user to utilize real world objects to interact with the UI is discretion. For example, in mobile device, one type of user devices 100, a mobile's device's touch screen is generally emitting light while the user interacts with the touch screen. The emission of light is necessary to convey artificial boundaries between regions of the touch screen. In an environment with low ambient light, such as a movie theater, the emission of light from a touch screen may be distracting to other movie patrons. By contrast, allowing the user to interact with real world objects that have natural features to convey boundaries between regions, such as the crevices that separate phalanges in each finger, may allow the user device 100 to provide similar functionality as a touch screen without emitting light that may be distracting to others.

Another possible benefit for allowing a user to utilize real world objects to interact with the UI is privacy. Although a user may be observed interacting with a real world object, the mapping of commands to regions of the real world object may be secret, known only to the user.

Figure 3:
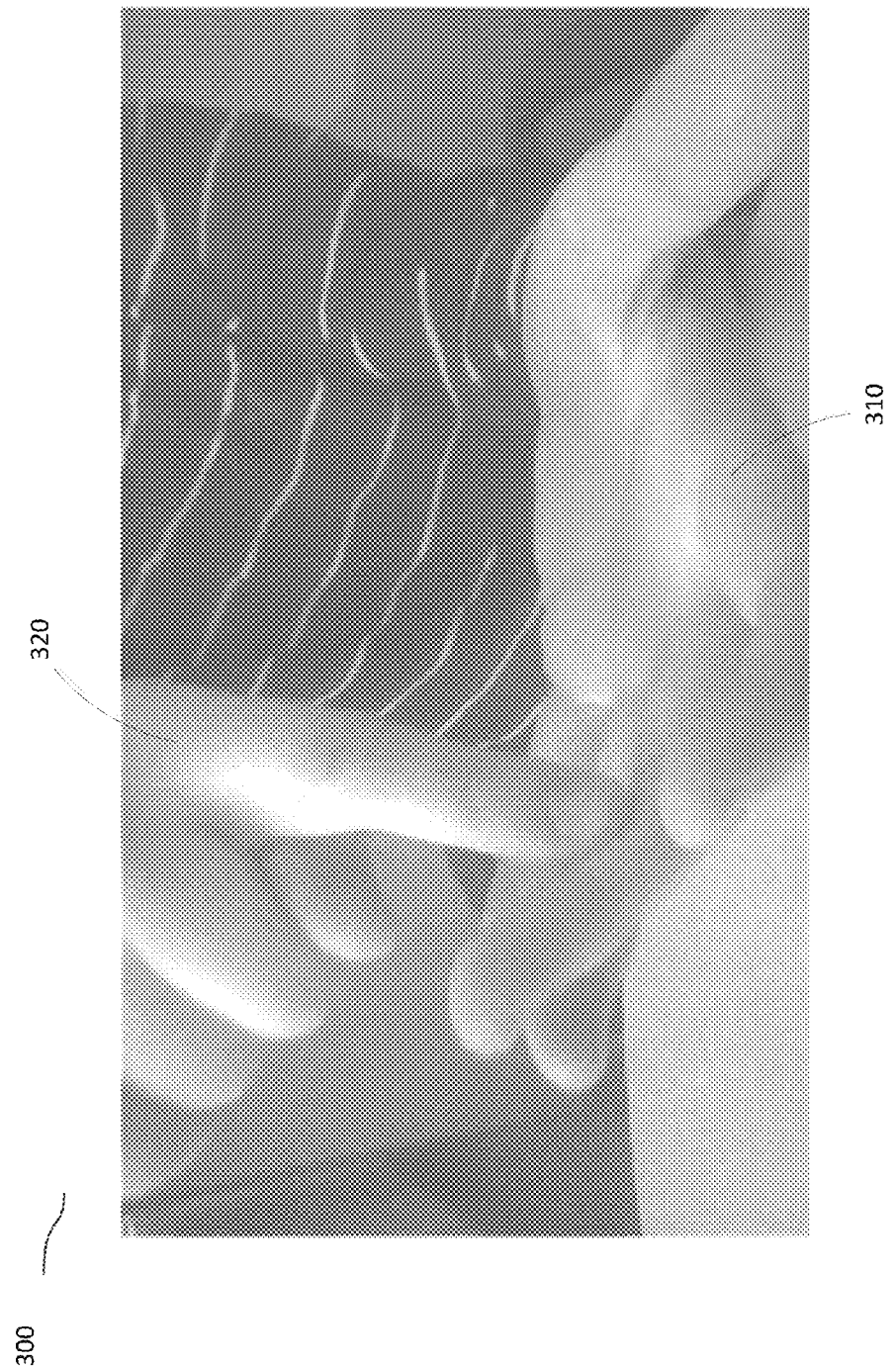
FIG. 3 illustrates an example of a user's hand interactions as a way to control the user interface on a device.

FIG. 3 illustrates an example of a user using their hands as the interactive surface area and the interacting object. Example 300 is from the camera's frame of reference. The flat hand that is slightly perpendicular with the camera is the interactive surface area 310. The interacting hand 320, the interacting object, is utilizing the palm region of the interactive surface area 310 to perform a command.

Figure 4:
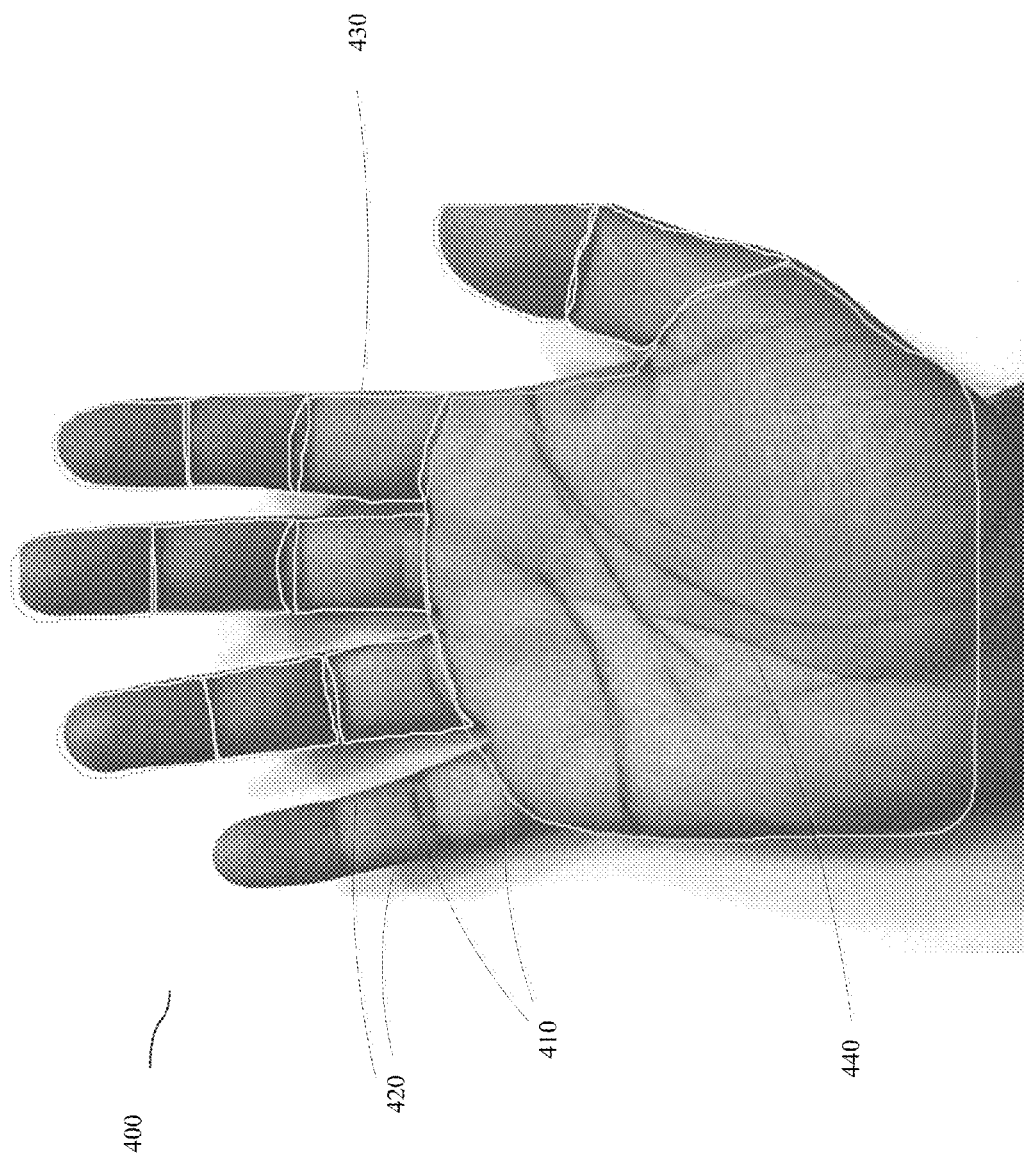
FIG. 4 illustrates an example of determining regions of the interactive surface area.

FIG. 4 illustrates an example of determining regions of the interactive surface area. In one embodiment, the regions of the interactive surface area may be determined based on color and/or physical features of the interactive surface area. In one example, the hand 400 has been identified as the interactive surface area, so the regions of the hand 400 may be determined based on various object recognition techniques, such as pattern recognition, appearance-based matching, color-based matching, image matching, feature-based detection or a combination thereof. The crevices 410 are physical features that can be detected and used to determine regions of the interactive surface area. In some embodiments, the crevice 410 may not have a clear boundary for a region 430, so a boundary may be extrapolated based on the crevice 410.

The boundaries 420 of each region of the interactive surface area may also be determined based on various objection recognition techniques including background subtraction, so that the region is limited to or in close proximity with the interactive surface area. Finally, each region 430 is determined, and the lines around each region are used only for illustrative purposes to show the boundary for each region 430.

The boundaries 420 of each region also depicts that the shape and size of each region is both dynamic, flexible and allow for unique shapes, so when commands are mapped to these boundaries 420 the entire region within these boundaries 420 can trigger the mapped command when the region is selected. By contrast in a projection system discussed earlier, the projection system had predefined shapes and only scaled the shapes so if projected on a phalanx such as boundary 420, the projection system will lose parts of the phalanx that are outside the projection system's scaled predefined shape or it may include areas that are outside of the boundary 420 of the phalanx.

In one embodiment, there may be extra regions available on the hand 400 that have natural physical boundaries; however, separating these areas into regions may lead to unwanted complexity in this interface. For example, the palm area 440 of a hand has numerous crevices that may appear to create separate regions; however, a user device 100 may limit the number of regions that can be determined in the palm area 440 or present the entire palm area 440 as a single region. By doing so, this may prevent popular commands from inadvertently being placed all over the palm area 440 and forcing the user to look at their hand 400 before selecting the region.

FIGS. 5A and 5B illustrates an example of remapping commands of the UI to visible regions of the interactive surface area. The hand 510 of a user is determined as the interactive surface area in both figures.

In FIG. 5A, the hand 510 is open and each finger, as well as each phalanx of each finger, is visible from the camera's frame of reference; as a result, each phalanx is determined as a separate region of the interactive surface area, and each region is mapped with a command. In FIG. 5A, the circled number on each region denotes a command associated with that region. For example, the proximal phalanx of the user's thumb is associated with the fourteenth command; whereas, the distal phalanx of the user's pinky finger is associated with the third command.

In FIG. 5B, the middle finger and pointer finger of the hand 510 both have moved down toward the palm area and as a result the phalanges of those fingers are no longer visible from the camera's frame of reference. Based on the change in visibility, a remapping process occurs and the commands are prioritized based on the command's likelihood of use, the number of commands required by the UI and/or application, the ability to organize the commands, and which regions were previously associated with the command. In this example, the thirteenth command had a higher priority than the third command; as a result, the command associated distal phalanx of the pinky finger was changed from the third command to the thirteenth command. In other cases, the commands remained associated with the previously associated region because the command's priority was high and there was no reason to move the command to a different region because it would cause the user needless confusion. This example shows how the user device 100 adapts the UI to the user rather than the user being forced to adapt to the UI.

Figure 6B:
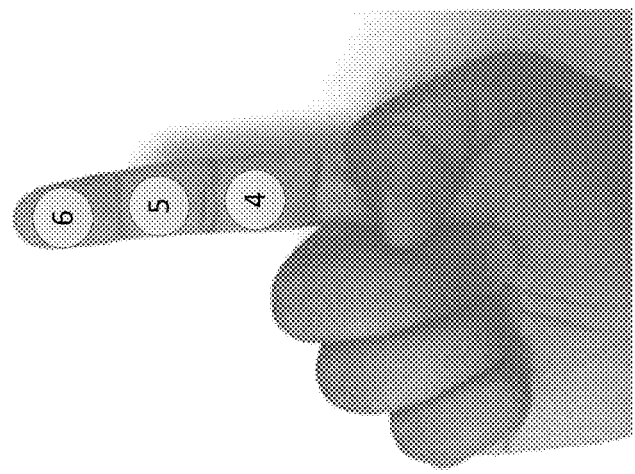
FIGS. 6A-6D illustrates examples of remapping commands on the interactive surface area based on a user's gesture.
Figure 6A:
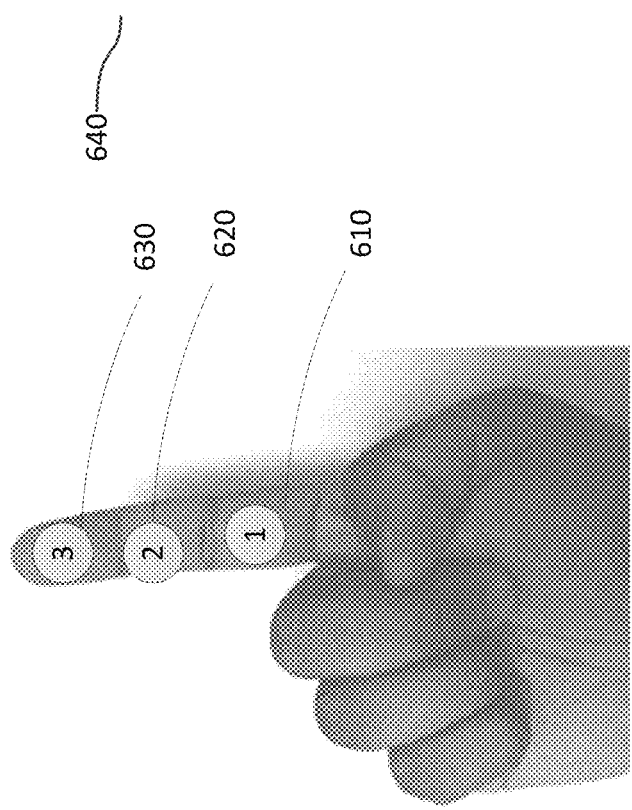

FIGS. 6A-D illustrates examples of remapping commands based on a user's gesture. In some embodiments, the user device 100 may identify a gesture performed by the interacting object in proximity with a region of the interactive surface area and map a new command to the region of the interactive surface area based on the gesture. This may be beneficial if the user wants control over how commands are mapped to regions of the interactive surface area and it allows the user to switch or scroll between commands. In some embodiments, if the number of commands required by the application exceed the number of regions on the interactive surface area, the user device 100 may organize commands into sets of commands and the sets of commands are associated to regions of the interactive surface area, wherein at least one command from the set of commands is mapped with the region at a particular time. In FIG. 6A, if there are more than three commands but there are only three regions available on the interactive surface area 600 then the commands are organized and the commands are mapped in order but only three commands are mapped. In this case, the first command is mapped to region 610, the second command is mapped to region 620 and the third command is mapped to 630.

The user may perform a gesture, such as a swipe up, to view additional commands. After the user performs a swipe up, FIG. 6B shows that the user device 100 switches the mapping for region 610 from the first command to the fourth command, region 620 from the second command to the fifth command and region 630 from the third command to the sixth command.

Figure 6C:
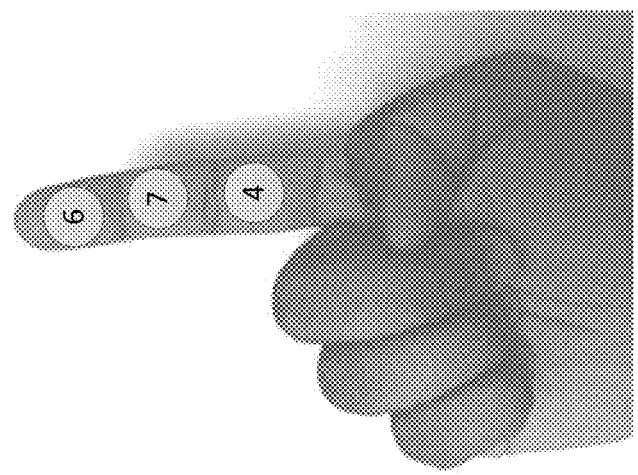

Additionally, a user device 100 may identify a gesture within the proximity of a region of the interactive surface area, determine a new command from the command set associated with the region of the interactive surface area based on the gesture, and may map the new command to the region of the interactive surface area. In one example, the user may perform a gesture, such as a swipe left or right, to change the command mapped to that particular region. If the user performs a swipe right on region 620, then the mapped command changes from the fifth command to the seventh command, as shown in FIG. 6C. If the user then performs a gesture on the same region, such as swipe right, then the user could cycle through all the available commands in the command set associated with region 620 until they found the command they wanted mapped to that particular region.

Figure 6D:
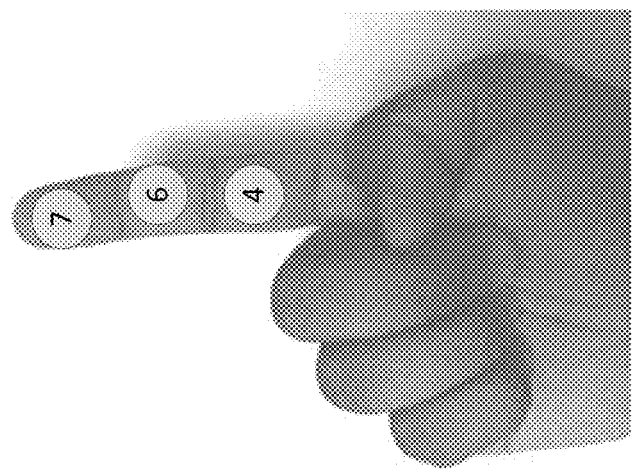

Moreover, a user device 100 may identify a gesture, wherein a starting position is in proximity with a first region of the interactive surface area and a ending position is in proximity with a second region of the interactive surface area, determine a first command associated with the first region; determine a second command associated with the second region, and mapping the first command to the second region and the second command to the first region. For example, the user may want the seventh command to be on region 630 and instead want the sixth command to be on region 620, as shown in FIG. 6D. The user may perform a gesture, such as a move gesture or pick up gesture, to select a command to be moved and move it accordingly. The circles with numbers in the FIGS. 6A-D are only used for illustrative purposes.

In some circumstances, the user device 100 identify remapping gestures to remap commands even if the required number of commands do not exceed the number of available regions. This may be beneficial to the user, because it gives them more control over their user input experience.

In some circumstances, the user device 100 may organize common command into a menu, similar to a dropdown menu. For example, the commands "Open", "Save", "Save As" and "Print" may be grouped in a category and the category may be mapped to a particular region, so a user may be able to perform a gesture, such as swipe, until the command they wanted is mapped to the region.

Figure 7:
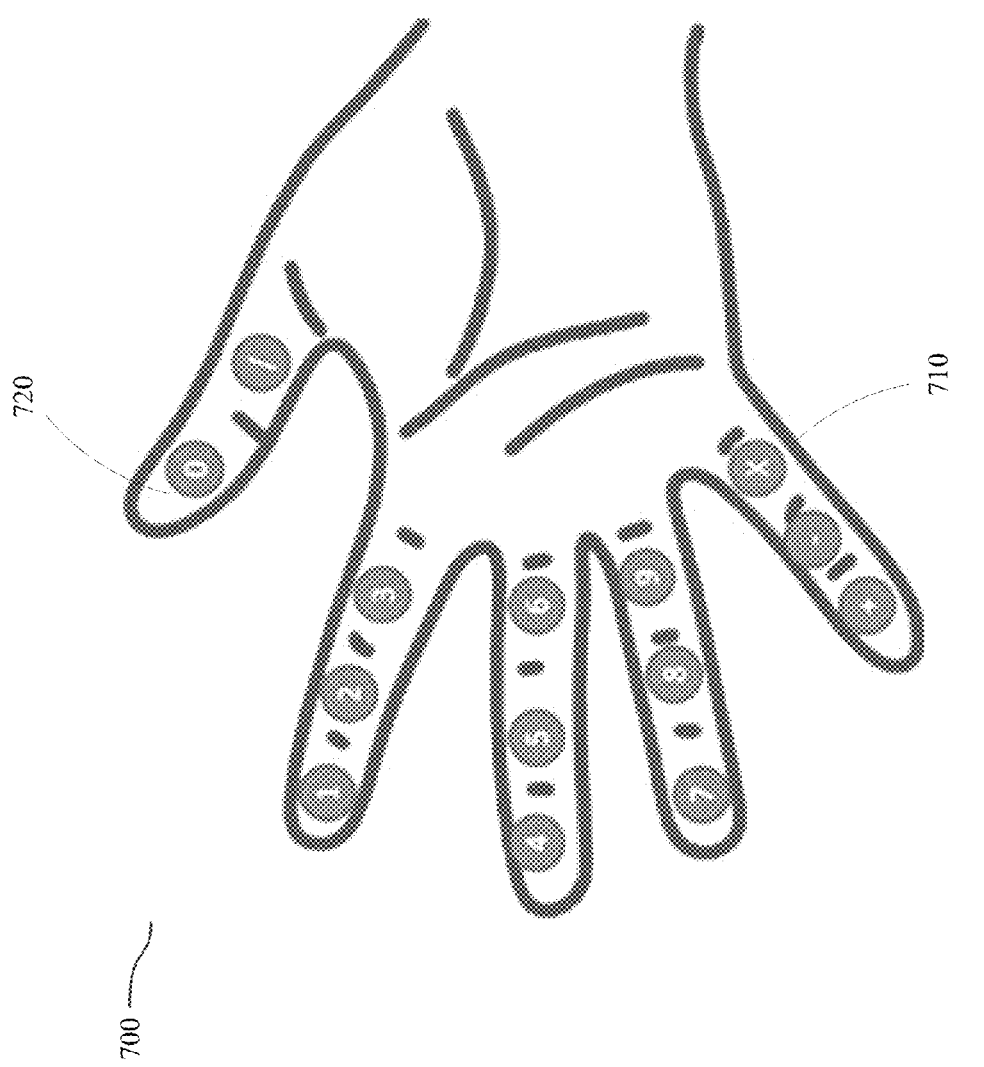
FIG. 7 illustrates an example of a mapping a calculator application to regions of a user's hand.

FIG. 7 illustrates an example of mapping a calculator application to regions of a hand 700, which is the interactive surface area. The hand 700 consists of mapped regions with each region being a phalanx. For example, region 710 and 720 are each a region associated with a phalanx with region 710 mapped to the command of addition, which is indicated by the plus sign, and region 720 mapped to the number zero.

In some embodiments, the user device 100 may display a visual depiction of the interactive surface area, wherein the visual depiction may be shown in a tutorial application or tutorial state. In some embodiments, the user device 100 may display a visual depiction of the interactive surface area after commands have been mapped to regions of the interactive surface area. In some embodiments, the user device 100 may display a visual depiction of the interactive surface area for a predetermined period of time, and may hide the visual depiction after the predetermined period of time expires. In some embodiments, the user device 100 may determine whether to display a visual depiction based on the cumulative amount of time a user has used the interface, the user's speed in performing a command, or any combination thereof.

Figure 8:
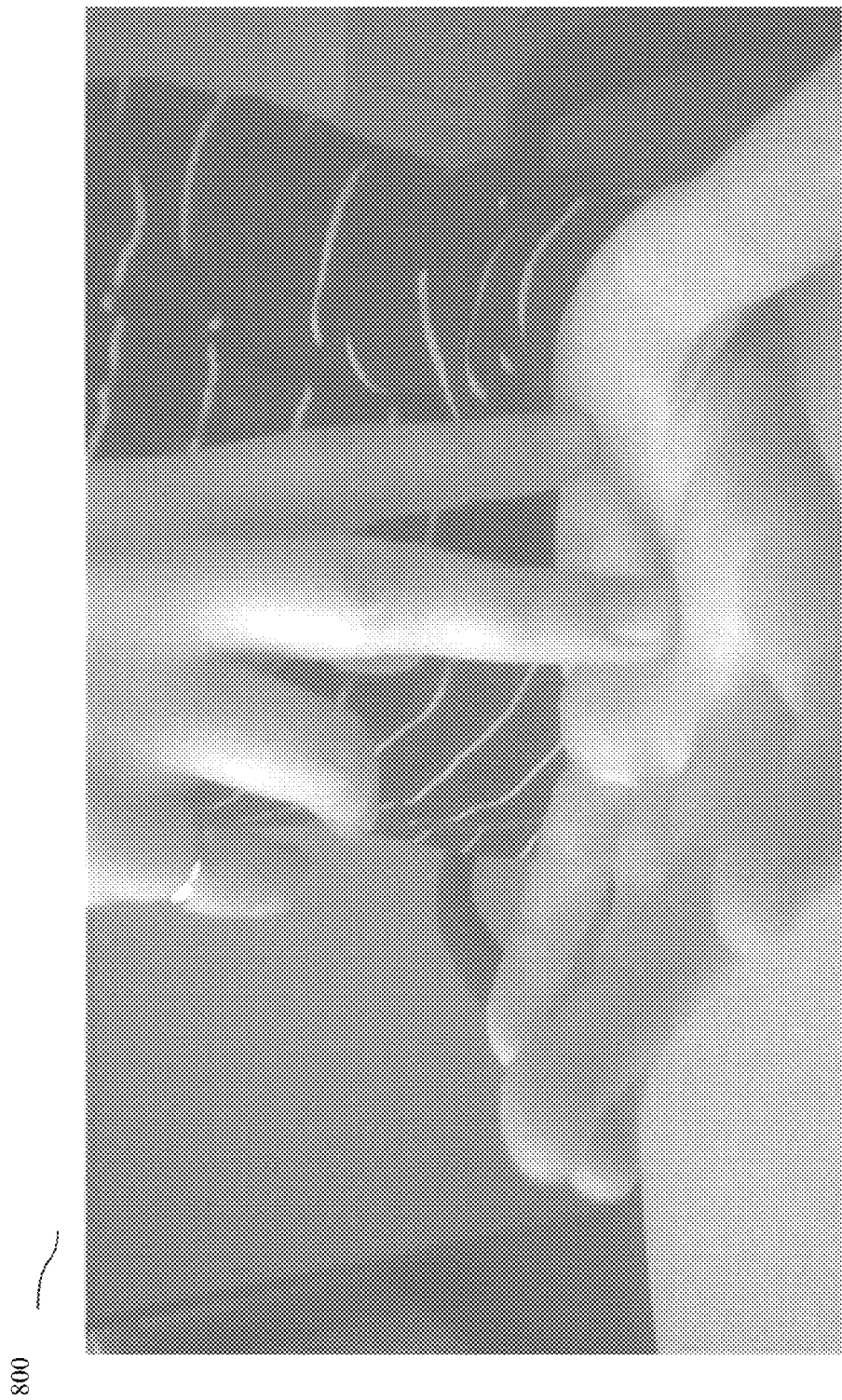
FIG. 8 illustrates an example of user performing a gesture with their hands.

FIG. 8 illustrates an example of a user performing a gesture with their hands.

In some embodiments, the real world object user input interface described may always be on when the user device 100 is powered on. In some embodiments, the real world object user input interface described may always be on when a second device, that is attached to the user device 100 either thru a wired and/or wireless interface, is powered on.

Figure 9:
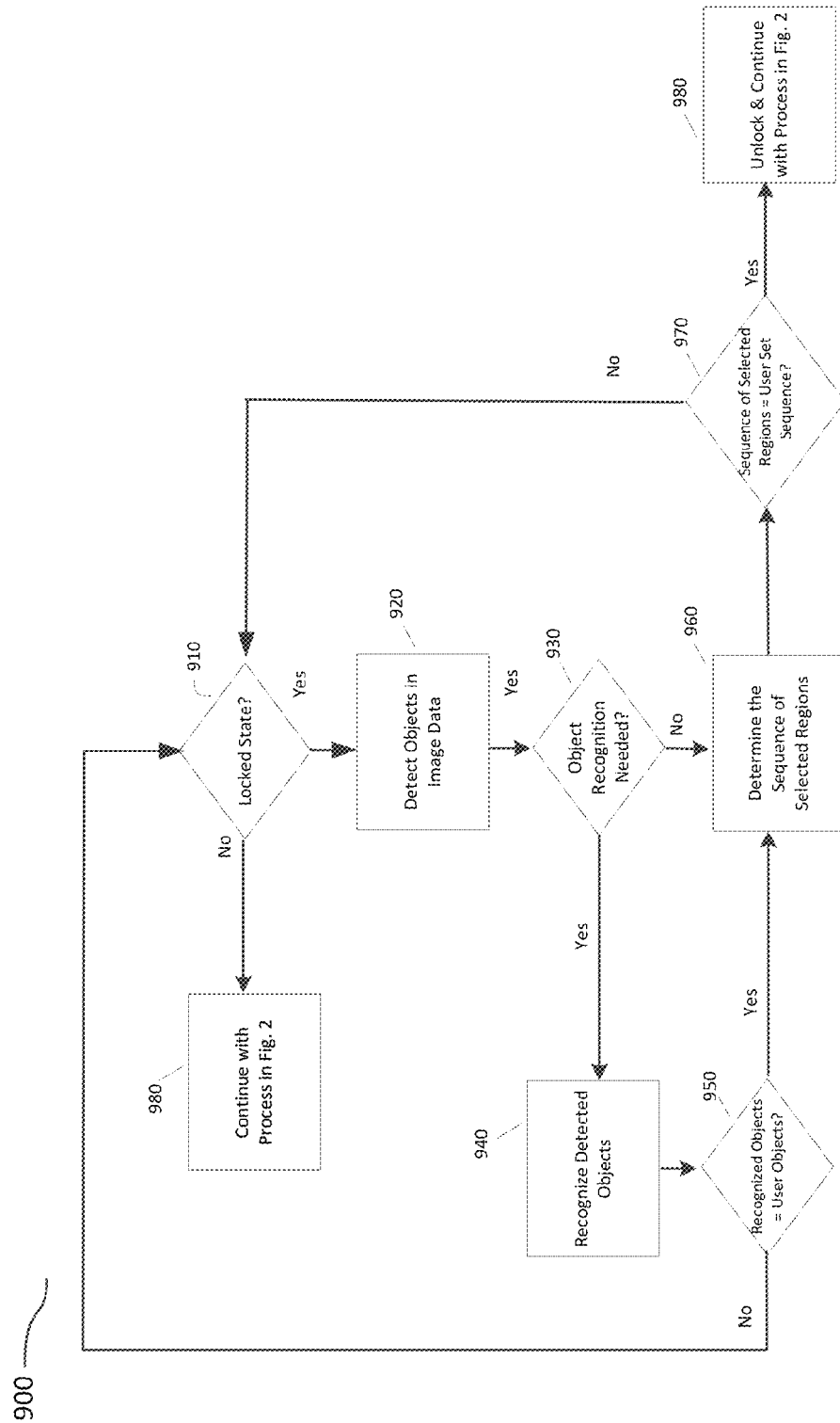
FIG. 9 illustrates a flow diagram illustrating a method for locking/unlocking the real world object user input interface on the user device 100.

FIG. 9 illustrates a flow diagram illustrating a method for locking/unlocking the real world object user input interface on the user device 100. The process begins by checking if the real world object user input interface is in a locked state (stage 910). If it is not, then the real world object user input operates normally, as described in FIG. 2.

If the real world object user input is locked, then the user device 100 receives image data and detects objects in the image data (stage 920).

After the objects are detected, the user device 100 determines if object recognition should be performed (stage 930). For example, a user may want only their hands to be used to active or deactivate the real world object input interface. One benefit is this adds an extra layer of protection, so not only does a particular sequence of regions of the interactive surface area have to be known, but also which objects must be used.

If object recognition is needed, the user device 100 performs object recognition on the detected objects (stage 940). For example, there may be three detected objects in the image data but the user device must classify each object, so object recognition is performed on each detected object and each detected object is classified as a particular real world object such as a hand, pencil, etc.

In stage 950, a check is performed to verify that all of the required user objects are found in the recognized objects. For example, if the required user objects requires two hands and the recognized objects includes two hands, a pencil and a stapler, then the process can proceed because the recognized objects includes the required user objects. If the required user objects are not found in the recognized objects then the process goes back to a locked state and begins again. Another benefit of these steps is it reduces power consumption by only performing the additional computer vision operations after the required user objects are found rather than performing it on a continual basis.

In some embodiments, the required user objects may be set when locking the real world object input interface. In some embodiments, the required user objects may be set after performing a particular gesture while the real world object input interface is unlocked. In some embodiments, the required user objects may be set via another user input interface such as voice input interface, touch input interface and/or gesture input interface.

After the recognized objects are determined to include the required user objects or object recognition is not needed, then an interactive surface area and interacting object are identified. If object recognition is needed, then the user device 100 identifies the required user objects and sets the required user interactive surface object as the interactive surface area and sets the required user interacting object as the interacting object. If the object recognition was not needed, then the interactive surface area and interacting object are identified as described in process 200.

Afterward, the user device 100 determines regions on the interactive surface area, then the user device 100 determines the sequence in which the user has selected regions of the interactive surface area with the interacting object (stage 960).

If the sequence of selected regions matches the user set sequence then the real world object input interface (stage 970) is unlocked (stage 980). If the sequence does not match the user set sequence then the real world object input interface remains locked and the process 900 begins again. In some embodiments, there may be a timer that will not start process 900 until the timer has expired.

In some embodiments, the user may prefer to set which regions must be selected but may not want the regions to be selected in a particular sequence. For example, the user may want three regions to be selected for the real world object input interface to be unlocked, but the user may not want each region to be selected in a particular sequence. In that embodiment, if the selected regions matches the user set selected regions then the real world object input interface 970 is unlocked 980.

In some embodiments, process 900 may be used to lock/unlock the user device 100 and/or the second device that is attached either thru a wired interface or wireless interface to the user device 100. One benefit may be that the user can create a locking/unlocking object sequence using real world objects so it is easier for the user to remember versus a traditional password and make the locking/unlocking object sequence makes it much more difficult for a second user to break into the user device 100 without explicit knowledge of the user's locking/unlocking object sequence and the objects used in the sequence.

In some embodiments, the real world object input interface may be activated and/or deactivated through a second input interface such as a touch input interface, voice input interface, gesture input interface, or any combination thereof. For example, a user may activate the real world object input interface through a touchscreen interface of the user device 100 or a second device attached thru a wired and/or wireless interface to the user device. In another example, a user may issue a voice command through a voice input interface of the user device 100 or a second device attached thru a wired and/or wireless interface to the user device.

In some embodiments, the real world object input interface may be activated and/or deactivated using process 900 in combination with a second input interface such as a touch input interface, voice input interface, gesture input interface or any combination thereof. For example, a user may activate the camera 140 on the user device 100 by issuing a voice command such as "Camera On", then the user can activate the real world object input interface by touching regions of the interactive surface area in a particular unlocking sequence with the interacting object.

Various wireless communication networks based on infrared, radio, and/or microwave technology can be used to implement described techniques. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, but it does not include propagating signals. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method of a device, comprising:
  processing image data to identify an interactive surface area and an interacting object using an object identification technique that differentiates between objects in the image data based at least in part on relative positions of the interactive surface area and the interacting object to one another without first recognizing an object comprising the interactive surface area or the interacting object;
  determining at least two regions of the interactive surface area;
  tracking each of the at least two regions of the interactive surface area;
  mapping commands of a user interface to the at least two regions of the interactive surface area, wherein the mapping commands of a user interface to regions of the interactive surface area further comprises:
    selecting a number of commands of the user interface from a plurality of user commands based on how many tracked regions comprise the tracked regions of the interactive surface area, wherein a number of commands of the plurality of commands exceeds how many tracked regions comprise the tracked regions; and
    correlating each tracked region with a different command based in part on priorities associated with each command, the priorities having been determined based in part on an application currently active on the device;
  determining a selected region of the interactive surface area based on a proximity of the interacting object to the interactive surface area; and
  performing a mapped command of the user interface, on the device, wherein the mapped command is determined based on the selected region.

2. The method of claim 1, wherein the processing the image to identify the interactive surface area is based on a pose of the interactive surface area.

3. The method of claim 1, wherein the interactive surface area is a hand and the interacting object is a thumb attached to the hand.

4. The method of claim 1, wherein the interactive surface area is a hand and the interacting object is a second hand.

5. The method of claim 1, wherein the interactive surface area may be one or more objects.

6. The method of claim 1, wherein the interacting object may be one or more objects.

7. The method of claim 1, wherein determining the at least two regions of the interactive surface area is based on physical features of the interactive surface area.

8. The method of claim 1, wherein the proximity comprises direct contact between the interacting object and the interactive surface area.

9. The method of claim 1, further comprising tracking the interacting object.

10. The method of claim 2, wherein the processing the image to identify the interactive surface area is further based on a number of objects in the image, a size of an object, a number of regions on the object, visibility of regions on an object, mobility of the object, the interacting object or any combination thereof.

11. The method of claim 1, wherein the interacting object is detected based on the number of objects in the image, size of an object, visibility of an object, mobility of an object, the interactive surface area or any combination thereof.

12. The method of claim 1, further comprising:
  determining a motion of the interacting object and whether the motion corresponds to a gesture;
  determining boundaries of each region of the interactive surface area that allows gestures;
  determining a command correlated to the gesture; and
  performing the command if the motion was performed within the boundaries.

13. The method of claim 12, wherein the motion was at least partially performed within the boundaries.

14. The method of claim 1, wherein the processing the image to identify the interactive surface area comprises identifying a predetermined movement in the image data that identifies the interactive surface area.

15. A method of a device, comprising:
  processing image data to identify an interactive surface area and an interacting object using an object identification technique that differentiates between objects in the image data based at least in part on relative positions of the interactive surface area and the interacting object to one another without first recognizing an object comprising the interactive surface area or the interacting object;
  determining at least two regions of the interactive surface area;
  tracking each of the at least two regions of the interactive surface area;
  mapping commands of a user interface to the at least two regions of the interactive surface area;
  determining visibility of each tracked region of the interactive surface area;
  determining priority of commands mapped on a hidden tracked region and on a visible tracked region responsive to the hidden tracked region being hidden;
  remapping commands from the hidden tracked region to the visible tracked region based on the priority of commands, wherein remapping the commands comprises comparing a first priority associated with a first command mapped to a hidden tracked region and a second priority associated with a second command mapped to a visible tracked region, and remapping the first command to the second tracked region responsive to the first priority exceeding the second priority;
  determining a selected region of the interactive surface area based on a proximity of the interacting object to the interactive surface area; and
  performing a mapped command of the user interface, on the device, wherein the mapped command is determined based on the selected region.

16. The method of claim 15, wherein the priority of commands are based on a command's likelihood of use, number of commands required, organization of commands, and regions previously associated with the command.

17. An apparatus, comprising:
at least one processor configured to:
process image data to identify an interactive surface area and an interacting object using an object identification technique that differentiates between objects in the image based at least in part on relative positions of the interactive surface area and the interacting object to one another without first recognizing an object comprising the interactive surface area or the interacting object;
determine at least two regions of the interactive surface area;
track each of the at least two regions of the interactive surface area;
map commands of a user interface to the at least two regions of the interactive surface area, wherein the at least one processor configured to map commands of a user interface to the at least two regions of the interactive surface area further configured to:
select a number of commands of the user interface from a plurality of user commands based on how many tracked regions comprise the tracked regions of the interactive surface area, wherein a number of commands of the plurality of commands exceeds how many tracked regions comprise the tracked regions; and
correlate each tracked region with a different command based in part on priorities associated with each command, the priorities having been determined based in part on an application currently active on the apparatus;
determine a selected region of the interactive surface area based on a proximity of the interacting object to the interactive surface area;
perform a mapped command, wherein the mapped command is determined based on the selected region; and
a memory coupled to the at least one processor.

18. The apparatus of claim 17, wherein the at least one processor configured to determine the at least two regions of the interactive surface area is based on physical features of the interactive surface area.

19. The apparatus of claim 17, wherein the at least one processor further configured to:
determine a motion of the interacting object and if the motion corresponds to a gesture;
determine boundaries of each region of the interactive surface area that allows gestures;
determine a command correlated to the gesture; and
perform the command if the motion was at performed within the boundaries.

20. An apparatus, comprising:
at least one processor configured to:
process image data to identify an interactive surface area and an interacting object using an object identification technique that differentiates between objects in the image based at least in part on relative positions of the interactive surface area and the interacting object to one another without first recognizing an object comprising the interactive surface area or the interacting object;
determine at least two regions of the interactive surface area;
map commands of a user interface to the at least two regions of the interactive surface area;
determine visibility of each tracked region of the interactive surface area;
determine priority of commands mapped on a hidden tracked region and on a visible tracked region responsive to the hidden tracked region being hidden;
remap commands from the hidden tracked region to the visible tracked region based on the priority of commands, wherein the at least one processor is configured to compare a first priority associated with a first command mapped to a hidden tracked region and a second priority associated with a second command mapped to a visible tracked region and to remap the first command to the second tracked region responsive to the first priority exceeding the second priority
determine a selected region of the interactive surface area based on a proximity of the interacting object to the interactive surface area;
perform a mapped command, wherein the mapped command is determined based on the selected region; and
a memory coupled to the at least one processor.

21. An apparatus, comprising:
means for processing image data to identify an interactive surface area and an interacting object using an object identification technique that differentiates between objects in the image data based on relative positions of the interactive surface area and the interacting object to one another without first recognizing an object comprising the interactive surface area or the interacting object;
means for determining at least two regions of the interactive surface area;
means for mapping commands of a user interface to the at least two regions of the interactive surface area, wherein the means for mapping commands of a user interface to regions of the interactive surface area further comprises:
means for tracking each of the at least two regions of the interactive surface area;
means for selecting a number of commands of the user interface from a plurality of user commands based on how many tracked regions comprise the tracked regions of the interactive surface area, wherein a number of commands of the plurality of commands exceeds how many tracked regions comprise the tracked regions; and
means for correlating each tracked region with a different command based in part on priorities associated with each command, the priorities having been determined based in part on an application currently active on the apparatus;
means for determining a selected region of the interactive surface area based on a proximity of the interacting object to the interactive surface area; and
means for performing a mapped command of the user interface, wherein the mapped command is determined based on the selected region.

22. The apparatus of claim 21, wherein the means for determining the at least two regions of the interactive surface area is based on physical features of the interactive surface area.

23. The apparatus of claim 21, wherein the means for identifying the interactive surface area is further based on a number of objects in the image, a size of an object, visibility of areas on the object, a number of regions on the object, mobility of the object, the interacting object or any combination thereof.

24. The apparatus of claim 21, wherein the means for identifying the interacting object is further based on the number of objects in the image, size of an object, visibility of an object, mobility of an object, the interactive surface area or any combination thereof.

25. A computer program product, comprising:
a non-transitory computer-readable storage medium comprising:
code for processing image data to identify an interactive surface area and an interacting object using an object identification technique that differentiates between objects in the image data based at least in part on relative positions of the interactive surface area and the interacting object to one another without first recognizing an object comprising the interactive surface area or the interacting object;
code for determining at least two regions of the interactive surface area;
code for mapping commands of a user interface to the at least two regions of the interactive surface area, wherein the code for mapping commands further comprises
code for tracking each of the at least two regions of the interactive surface area,
code for selecting a number of commands of the user interface from a plurality of user commands based on how many tracked regions comprise the tracked regions of the interactive surface area, wherein a number of commands of the plurality of commands exceeds how many tracked regions comprise the tracked regions, and
code for correlating each tracked region with a different command based in part on priorities associated with each command, the priorities having been determined based in part on an active application;
code for determining a selected region of the interactive surface area based on a proximity of the interacting object to the interactive surface area; and
code for performing a mapped command of the user interface, wherein the mapped command is determined based on the selected region.

26. An apparatus, comprising:
means for processing image data to identify an interactive surface area and an interacting object using an object identification technique that differentiates between objects in the image data based at least in part on relative positions of the interactive surface area and the interacting object to one another without first recognizing an object comprising the interactive surface area or the interacting object;
means for determining at least two regions of the interactive surface area;
means for tracking each of the at least two regions of the interactive surface area;
means for mapping commands of a user interface to the at least two regions of the interactive surface area;
means for determining visibility of each tracked region of the interactive surface area;
means for determining priority of commands mapped on a hidden tracked region and on a visible tracked region responsive to the hidden tracked region being hidden;
means for remapping commands from the hidden tracked region to the visible tracked region based on the priority of commands, wherein remapping the commands comprises comparing a first priority associated with a first command mapped to a hidden tracked region and a second priority associated with a second command mapped to a visible tracked region, and remapping the first command to the second tracked region responsive to the first priority exceeding the second priority; and
means for determining a selected region of the interactive surface area based on a proximity of the interacting object to the interactive surface area; and
means for performing a mapped command of the user interface, on the device, wherein the mapped command is determined based on the selected region.

27. A computer program product, comprising:
a non-transitory computer-readable storage medium comprising:
code for processing image data to identify an interactive surface area and an interacting object using an object identification technique that differentiates between objects in the image data based at least in part on relative positions of the interactive surface area and the interacting object to one another without first recognizing an object comprising the interactive surface area or the interacting object;
code for determining at least two regions of the interactive surface area;
code for tracking each of the at least two regions of the interactive surface area;
code for mapping commands of a user interface to the at least two regions of the interactive surface area;
code for determining visibility of each tracked region of the interactive surface area;
code for determining priority of commands mapped on a hidden tracked region and on a visible tracked region responsive to the hidden tracked region being hidden;
code for remapping commands from the hidden tracked region to the visible tracked region based on the priority of commands, wherein remapping the commands comprises comparing a first priority associated with a first command mapped to a hidden tracked region and a second priority associated with a second command mapped to a visible tracked region, and remapping the first command to the second tracked region responsive to the first priority exceeding the second priority; and
code for determining a selected region of the interactive surface area based on a proximity of the interacting object to the interactive surface area; and
code for performing a mapped command of the user interface, on the device, wherein the mapped command is determined based on the selected region.

* * * * *